United States Patent [19]

Shaffer et al.

[11] Patent Number: 5,085,847
[45] Date of Patent: Feb. 4, 1992

[54] APPARATUS FOR PRODUCING A FAST DISSOLVING GRANULAR PRODUCT

[75] Inventors: John H. Shaffer, Cleveland; William L. Kurtz, Chattanooga, both of Tenn.

[73] Assignee: Olin Corporation, Cheshire, Conn.

[21] Appl. No.: 353,571

[22] Filed: May 18, 1989

[51] Int. Cl.⁵ .............................................. C01B 11/06
[52] U.S. Cl. ....................................... 423/474; 423/473
[58] Field of Search ................................. 423/473, 474; 252/187.29

[56] References Cited

U.S. PATENT DOCUMENTS

| | | | |
|---|---|---|---|
| 2,901,435 | 8/1959 | Robson | 423/474 |
| 3,969,546 | 7/1976 | Saeman | 423/474 |
| 4,146,578 | 3/1979 | Brennan et al. | 423/473 |
| 4,147,761 | 4/1979 | Wojtowicz et al. | 423/473 |

FOREIGN PATENT DOCUMENTS 196884 10/1986 European Pat. Off. ............ 423/474

Primary Examiner—Michael L. Lewis
Assistant Examiner—Brian M. Bolam
Attorney, Agent, or Firm—Ralph D'Alessandro

[57] ABSTRACT

A process and apparatus utilizing the process of the present invention are provided to produce a fast dissolving, thermally sensitive granular product. The process employs a fluidized spray dryer having a fluidized bed of granular particles into which recycled off-sized product is fed after being agglomerated to adjust particle size. The spray dryer optionally can employ a second nozzle positioned above the fluidized bed. The process can be employed in the production of calcium hypochlorite water sanitizing chemical wherein the chlorine is supplied from a hypochlorous acid reactor and lime hypochlorinator.

30 Claims, 2 Drawing Sheets

APPARATUS FOR PRODUCING A FAST DISSOLVING GRANULAR PRODUCT

BACKGROUND OF THE INVENTION

This invention relates generally to apparatus used to produce a water sanitizing product containing a halogen compound. More specifically, the improved apparatus relates to the design of a spray dryer and its use in combination with a fluid bed dryer and agglomerating apparatus to produce fast dissolving granular product, such as bleaching and sanitizing agents for body of water like calcium hypochlorite.

Bleaching and sanitizing agents for use in bodies of water, particularly in the sanitation and disinfection of swimming pool waters, have been commercially utilized for a number of years. Calcium hypochlorite has been a particularly effective agent because of its relative stability and its being an inexpensive solid oxidizing agent that uses its available chlorine to remove impurities and kill pathogenic organisms in water.

Calcium hypochlorite has been manufactured or proposed for manufacture from lime and sodium hydroxide by a number of processes that attempt to produce the highest quality product that is contaminate free in the most cost effective manner. Exemplary of these different processes are the use of a slurry containing crystals of calcium hypochlorite dihydrate in a concentrated aqueous solution of calcium hypochlorite and sodium chloride, or other inorganic halides, or the admixing of a wet cake of calcium hypochlorite in a cutting type mixer with dry fines in sufficient proportion to decrease water content to the desired level. U.S. patent application No. 898,841, filed Aug. 19, 1986 by Bridges and assigned to the assignee of the present invention, discloses a process to produce calcium hypochlorite particles with the use of a turbine agglomerator. Still another approach was developed using spray graining techniques to produce the desired product granules by the spraying and drying of calcium hypochlorite slurries.

Most recently, a process producing a hypochlorinated acid by the mixing and reaction of an alkali metal hydroxide and a chlorine gas has been perfected to provide the chlorinating agent that can be used to produce calcium hypochlorite.

There has been a continuing need to develop a fast dissolving granular product that is dust free and, especially in the area of swimming pool chemical product manufacture, that permits longer operating times of the equipment without the need for maintenance because of the corrosive nature of the product and the reactants employed. Similarly, the nature of the product produced in swimming pool chemical product manufacture requires ease of handling.

Previous processes, and the apparatus employed in these processes, have suffered from not achieving substantially complete reactions between the halogen and the alkali metal hydroxide, or have produced product that has not been sufficiently dry to facilitate handling. The sizing of the particles has been a continuing problem since oversized particles contain excessive moisture so that caking results and the caked mass adheres to apparatus surfaces, increasing the maintenance time required and causing damage to equipment. Alternately where a drier product was obtained, the final product produced by previous processes had excessive dust which resulted in loss of desired product and disintegration of products into difficult to handle and aesthetically unattractive product masses for consumers.

These problems are solved by the present invention wherein improved apparatus and a process product for thermally sensitive materials.

SUMMARY OF THE INVENTION

It is an object of the present invention to provide improved apparatus and an improved process which produce a fast dissolving granular product that is easy to handle and relatively dust free.

It is another object of the present invention to provide apparatus in a process which reduces the maintenance time needed and maximizes the operating time of the apparatus and the process.

It is a feature of the present invention that an improved fluidized spray dryer is employed that has a second spray nozzle and is positioned to spray product immediately above a fluidized bed in a fluidized bed dryer.

It is another feature of the present invention that the improved spray dryer can be used to control particle size and density.

It is another feature of the present invention that the process employs a turbine agglomerator in conjunction with an offsized product recycle stream and the fluidized spray dryer to obtain on-size product particles with the desired density.

It is still another feature of the present invention that the fast dissolving granular product is produced by single step drying in the process which employs an improved fluidized spray dryer with a fluidized bed that minimizes the amount of dust in the product by forcing the dust to continuously grow in size before leaving the dryer.

It is an advantage of the present invention that a fast dissolving granular product is obtained by a process which ideally will handle thermally sensitive material.

It is another advantage of the present invention that the fluidized spray dryer with the second nozzle can impart new or improved properties to the product by spraying directly onto the fluidized bed. These improved properties can include desired size and density characteristics.

It is another advantage of the present invention that the apparatus employed has longer operating times with less time required for maintenance and less build up of moist, potentially corrosive material on the apparatus.

These and other objects, features, and advantages are provided in the process and the apparatus employed in the process for the production of a fast dissolving granular product, such as a calcium hypochlorite pool chemical, which employs a fluidized bed dryer to apply a spray coating to the product particles in conjunction with a turbine agglomerator.

BRIEF DESCRIPTION OF THE DRAWINGS

The advantages of this invention will become apparent upon consideration of the following detailed disclosure of the invention, especially when it is taken in conjunction with the drawings wherein.

DETAILED DESCRIPTION OF THE PREFERRED EMBODIMENT

What follows is a detailed description of the preferred embodiment of the invention described herein. It should be understood while the invention will be described in context of the process and apparatus used to produce the calcium hypochlorite pool chemical, the apparatus and the process, with minor modifications, could equally well be applied for drying any thermally sensitive material that requires a dust free end product, such as granular chlorinated isocyanurates, coffee, dry milk, or sugar.

Figure 1:
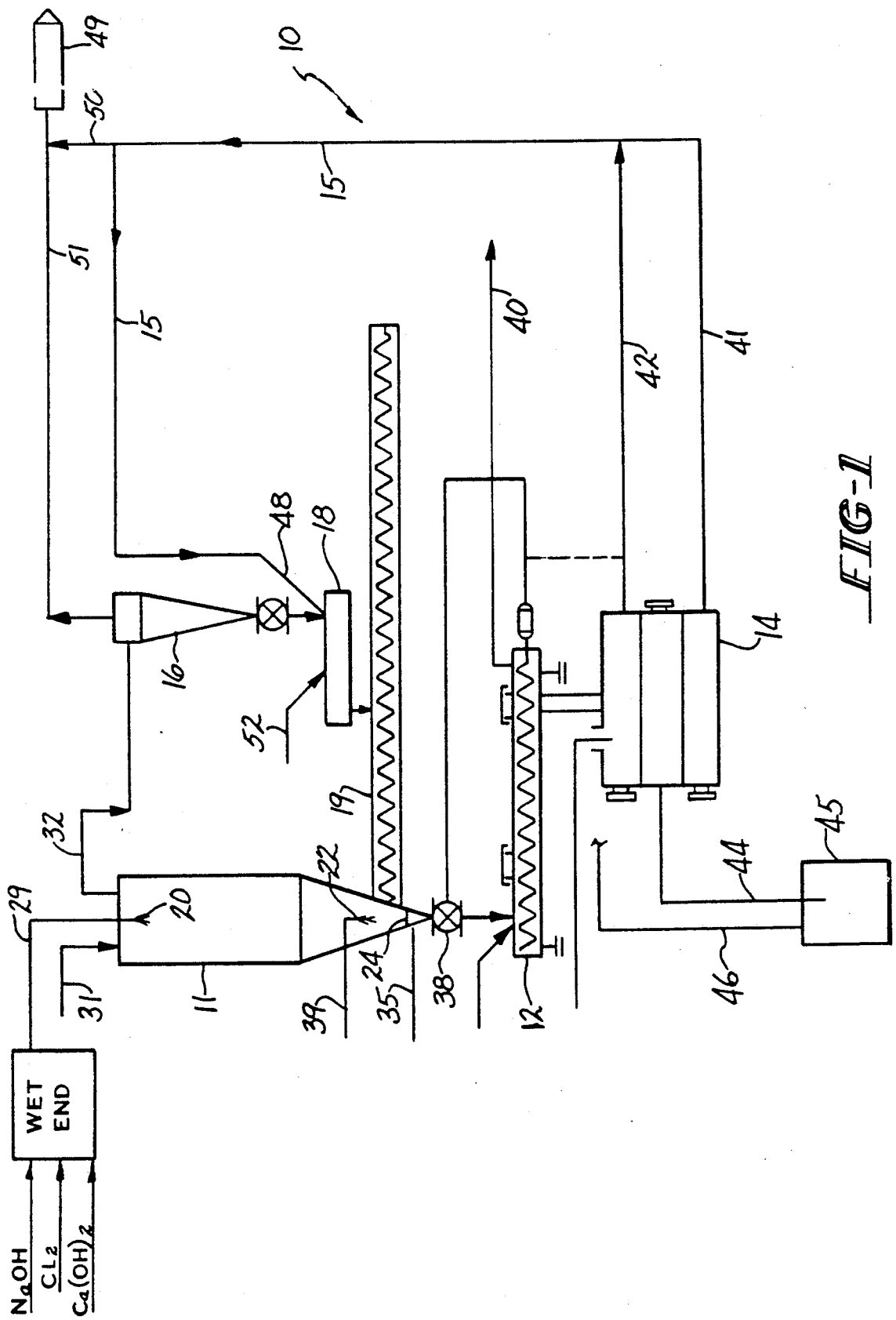
FIG. 1 is a diagrammatic view of the apparatus employed in the process used to produce the on-sized fast dissolving granular product.

FIG. 1 shows a diagrammatic illustration of the process utilized on the dry end to produce the fast dissolving granular product.

The particular calcium hypochlorite process employs a wet end and a dry end, utilizing a reactor to obtain hypochlorous acid that is ultimately liquified in aqueous form to provide the chlorine source to produce the calcium hypochlorite feed in the wet end for the particle size, density, and moisture adjustments accomplished in the dry end. The calcium hypochlorite is produced from hypochlorous acid by the following reactions:

$$NaOH + Cl_2 \rightarrow HOCl + NaCl$$

$$2HOCl + Ca(OH)_2 \rightarrow Ca(OCl)_2 + 2H_2O.$$

The main wet end reaction produces dihydrated calcium hypochlorite from the reaction:

$$2HOCl + Ca(OH)_2 \rightarrow Ca(OCl)_2 \cdot 2H_2O.$$

The principal dry end reaction dries the dihydrated calcium hypochlorite as follows:

$$Ca(OCl)_2 \cdot 2H_2O \rightarrow Ca(OCl)_2 + 2H_2O.$$

The following two secondary reactions occur during the process and should be minimized by controlling the process conditions:

$$3Ca(OCl)_2 \rightarrow Ca(ClO_3)_2 + 2CaCl_2$$

$$2H_2O + Ca(OCl)_2 + CaCl_2 \rightarrow 2Ca(OH)_2 + 2Cl_2$$

The dry end apparatus is indicated generally by the numeral 10 and includes a fluidized spray dryer 11, an auger or screw feed conveyor 12, a screening apparatus 14, a return loop 15, a cyclone separator 16 and a turbine agglomerator 18 that feeds into a fines return conveyor means 19. The fines return conveyor means 19 feeds the turbine agglomerated fines into the bed at the bottom of the fluidized spray dryer bed 11.

Figure 2:
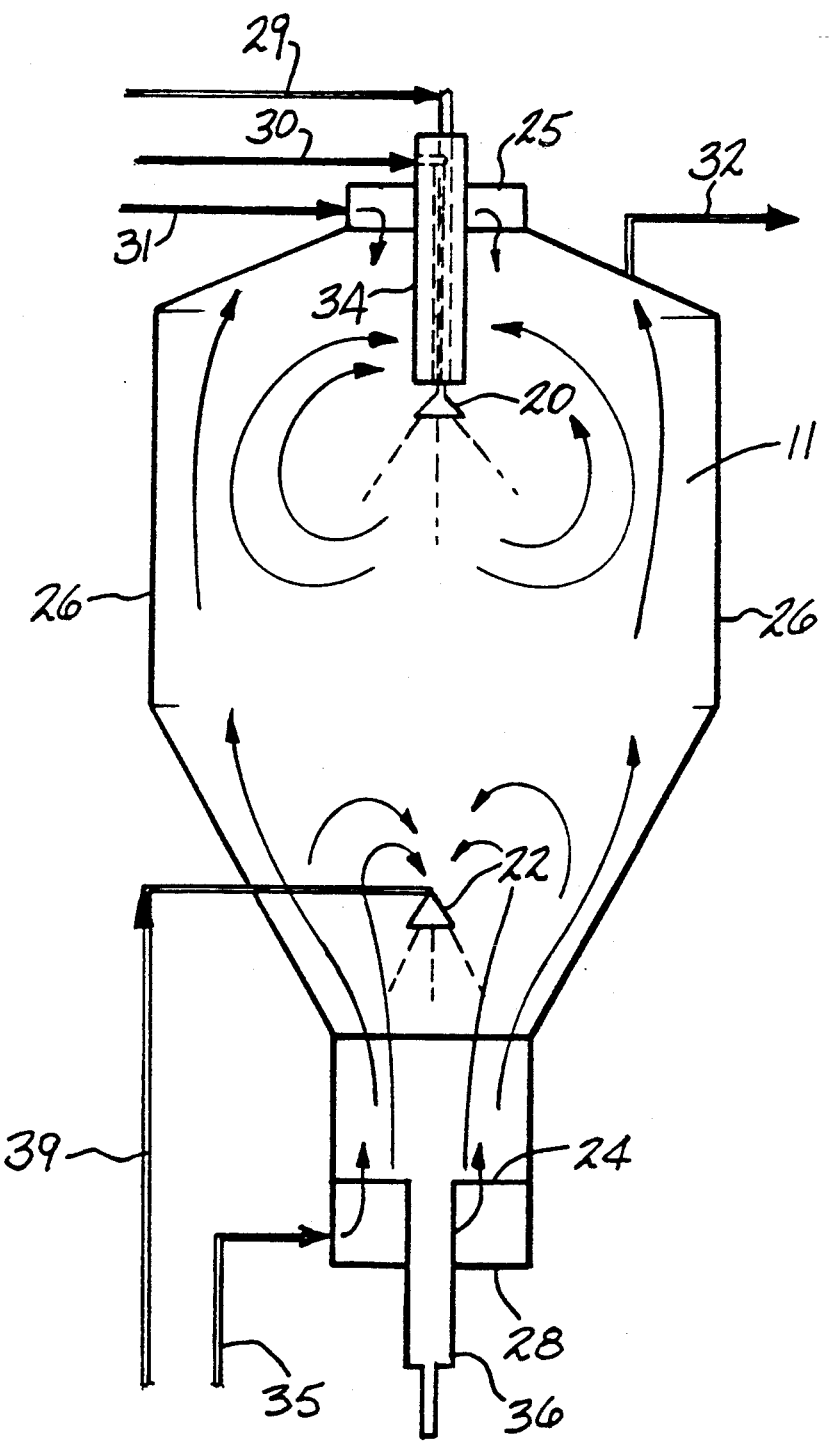
FIG. 2 is an enlarged side elevational view of a fluidized bed dryer showing the employment of a second spraying nozzle immediately over the fluidized bed.

FIG. 2 shows in greater detail the fluidized bed dryer 11 which can employ either a single nozzle 20 or a second nozzle 22 which is positioned immediately over the fluidized bed 24 of granular particles. Dryer 11 is shown in FIG. 2 as having a top 25 through which reactants are fed into the interior of the dryer, side walls 26, and a bottom 28 through which the product particles pass. A slurry of calcium hypochlorite dihydrate, preferably formed from the reaction of hypochlorous acid and lime, is fed into the top 25 of dryer 11 via feedline 29 to be sprayed into the top of the dryer 11 by the two-fluid nozzle 20 or any suitable atomizing apparatus. The majority of the atomized slurred feed, possibly as much as two-thirds, exits dryer 11 as dried powder via an exit air line 32 and is fed to the separation device or cyclone 16 of FIG. 1.

The air is fed in through air line 30 to atomize the calcium hypochlorite slurry. Hot air is fed in through the side of the top via infeed line 31 into a plenum and is diffused by a diffuser plate down into the dryer 11 to be cocurrent with the spray and to surround the spray. This warm air effectively dries the atomized slurry material to a moisture content level of from about 5 to about 15% by weight.

The atomizing airline 30 and the slurried calcium hypochlorite feedline 29 pass through a sleeve 34 that extends from the top of dryer 11 downwardly prior to mixing the air and the calcium hypochlorite upon reaching nozzle 20. At the bottom of the dryer 11 a hot air feedline 35 delivers hot drying air into the fluidized bed 24 of granular particles to fluidize the bed and dry it further to the desired moisture content level of about 6 to about 20 and, more preferably, of about 8 to about 12% by weight in a single process step. This is accomplished by the hot air delivered by feedline 35 blowing dust particles upwardly into the spray of nozzle 20 so these particles increase or grow in size. In this manner the amount of dust produced in the granular product is minimized while producing particle sizes of −20 to +50 mesh size and a percentage by weight of about 79 to about 89% calcium hypochlorite. The product particles exit the spray dryer through a chute 36 that connects to a metering air lock rotary valve 38 seen in FIG. 1. Approximately one-third of the slurried calcium hypochlorite feed introduced through line 29 drops to the fluidized bed 24 at the bottom of dryer 11.

Where the second nozzle 22 is employed in the dryer 11, it is positioned so that it sprays downwardly just above the fluidized bed 24. Nozzle 22 is provided with its liquid by infeed line 39. Nozzle 22 can be used to put a separate coating material on the product particles in the fluidized bed 24 or to further increase the size of the product particles. Infeed line 39 can provide a material, such as a brine spray or an additional slurry of calcium hypochlorite or other compatible liquids, to effect changes in properties and other characteristics of the product particles. The properties affected can be the density where slurried calcium hypochlorite is applied or consumer oriented features, such as chlorine odor or friability, where a separate coating material is applied.

This second nozzle 22 adds liquid with dissolved solids that goes into the interior of the product particles by capillary action which leaves behind solids when the liquid is evaporated in the fluidized bed 24 to give a denser product particle. Dust particles agglomerate on the exterior of the product particles to increase particle size.

As seen in FIG. 1, the product exits the bottom of the dryer 11 and passes through the metering airlock rotary valve 38 into the auger conveyor 12. Conveyor 12 carries the product to the screen 14 to separate the off-sized product from the on-sized product. Undersized product can be recycled from conveyor 12 as dust particles via line 40 to return loop 15. Conveyor 12 feeds the product particles into screen 14 where oversized particles are separated via oversized particle recycle line 42 and undersized particles are recycled via undersized particle recycle line 41 into return loop 15 for transport to the turbine agglomerator 18. On-size particles are discharged through discharge line 44 into a pack out station 45 which can have a vent line 46 to remove dust to, for example, a solids separation device (not shown). Dust recycle line 40 can similarly remove dust from conveyor 12 to the same solids separation device. The recycled undersized product particles and oversized product particles are passed via return loop 15 into the agglomerator feed chute 48. The recycled material from the agglomerator feed chute is mixed with captured dry material having about 5% moisture from cyclone 16 and is introduced into the turbine agglomerator 18. Dust particles from the recycle loop 15 can pass to scrubber 49 via dust vent line 50 where they are joined by dust particles coming from the cyclone 16 via dust vent line 51.

Agglomerator 18 has a liquid spray, which can be water or a calcium hypochlorite slurry or a calcium hypochlorite filtrate that is fed in via line 52 to spray on the recycled material to obtain approximately a 10–22% moisture content. The agglomerator increases the particle size and density to that desired via crushing, agglomeration, and compaction by rotating paddles that mix the recycled feed material with the liquid. The agglomerated material is returned to the fluidized bed 24 of the dryer 11 via the fines return conveyor 19.

The process stream flow rates for the entire process shown in FIG. 1 can be described within prescribed preferred parameters. The slurry fed in through the calcium hypochlorite feedline 29 can flow from a rate of about 0.4 to about 4.0 gallons per minute while the hot air fed in through feed line 31 can range in temperature from about 250° Centigrade to about 400° Centigrade with a feed rate of about 800 to about 1300 standard cubic feet per minute. Where second nozzle 22 is employed in the dryer 11, the flow rate of the liquid through infeed line 39 can range from about 0.016 to about 0.16 gallons per minute. Hot air fed into the fluidized bed 24 of the dryer 11 can range in temperature from about 95° C. to about 140° C. with a flow rate of about 350 to about 500 standard cubic feet per minute. The liquid fed into liquid feedline 52 to the turbine agglomerator 18 can have a flow rate of about 0.03 to about 0.6 gallons per minute. The recycle loop 15 can have anywhere from about 1 to about 10 tons per day of product particles recycled through it, while the cyclone 16 can receive about 0.67 to about 6.7 tons per day through the air exit line 23 from the dryer 11. The amount of product produced at the packout station 45 can vary from about 1 to about 10 tons per day.

While the preferred structure and process in which the principles of the present invention have been incorporated is shown and described above, it is to be understood that the invention is not to be limited to the particular details presented, but in fact, widely different means and process steps may be employed in the broader aspects of this invention. The scope of the appended claims is intended to encompass all obvious changes in the details, materials and arrangements of parts and process steps which will occur to one in the skill of the art upon reading of the disclosure.

What is claimed is:

1. A process for the production of calcium hypochlorite from hypochlorous acid comprising the steps of:
   (a) mixing aqueous sodium hydroxide and gaseous chloride to produce hypochlorous acid;
   (b) mixing aqueous hypochlorous acid and lime to produce an aqueous calcium hypochlorite slurry;
   (c) feeding the calcium hypochlorite in slurry form to a spray dryer to form granular particles by spraying generally downwardly atomized calcium hypochlorite into a cocurrent first drying gas air flow stream separate from the sprayed stream of atomized calcium hypochlorite to dry the atomized calcium hypochlorite;
   (d) collecting the granular particles in a fluidized bed at the bottom of the dryer;
   (e) forcing dust particles in the fluidized bed upwardly from the bed of granular particles into the generally downwardly sprayed atomized calcium hypochlorite to cause the dust particles to increase in size to minimize the dust in the bed of granular particles; and
   (f) further drying the granular particles by forcing a second drying gas flow stream through the fluidized bed to obtain a final moisture content in the granular particles.

2. The process according to claim 1 further comprising separating the granular particles by size into on-size and off-size flow streams.

3. The process according to claim 2 further comprising recycling the off-size flow stream to the spray dryer via a recirculation loop for resizing.

4. The process according to claim 3 further comprising feeding the recirculation loop feed into an agglomeration means to adjust the size and density of the granular particles.

5. The process according to claim 4 further comprising feeding dust particles from the recirculation loop into the agglomeration means for agglomeration via moisture addition to form granular particles.

6. The process according to claim 4 further comprising feeding oversized particles from the recirculation loop into the agglomeration means for breaking up into smaller granular particles.

7. The process according to claim 4 further comprising drying the fluidized bed of granular particles with upwardly directed drying gas.

8. The process according to claim 7 further comprising feeding granular particles from the agglomeration means into the fluidized bed.

9. The process according to claim 8 further comprising spraying the fluidized bed of granular particles by a second spraying nozzle immediately above the fluidized bed.

10. The process according to claim 1 further comprises directing the first drying gas air flow stream that dries the atomized calcium hypochlorite cocurrently with the flow of atomized calcium hypochlorite.

11. The process according to claim 10 further comprising directing the second drying gas flow stream to flow countercurrent to the first drying gas air flow stream generally upwardly through the fluidized bed of granular particles.

12. The process according to claim 9 further comprising spraying liquified calcium hypochlorite or brine from the second spraying nozzle.

13. The process according to claim 4 further comprising using a turbine agglomerator as the agglomeration means.

14. The process according to claim 10 further comprising drying the atomized calcium hypochlorite with the cocurrent first drying gas air flow stream to a moisture content of from about 5 to about 15 percent by weight.

15. The process according to claim 9 further comprising drying the bed of granular particles in the fluidized bed by the second drying gas flow stream to obtain a final moisture content of about 6 to about 20 percent by weight in the granular particles.

16. A process for the production of calcium hypochlorite comprising the steps of:
   (a) feeding calcium hypochlorite in slurry form to a sprayer dryer to form granular particles by spraying generally downwardly atomized calcium hypochlorite into a cocurrent first drying gas air flow stream separate from the sprayed stream of atomized calcium hypochlorite to dry the atomized calcium hypochlorite;
   (b) collecting the granular particles in a fluidized bed at the bottom of the dryer;
   (c) forcing dust particles in the fluidized bed upwardly from the bed of granular particles into the generally downwardly sprayed atomized calcium hypochlorite to cause the dust particles to increase in size to minimize the dust in the bed of granular particles; and
   (d) further drying the granular particles by forcing a second drying gas flow stream through the fluidized bed to obtain a final moisture content in the granular particles.

17. The process according to claim 16 further comprising drying the atomized calcium hypochlorite with the cocurrent first drying gas air flow stream to a moisture content of from about 5 to about 15 percent by weight.

18. The process according to claim 16 further comprising spraying downwardly into the bed of granular particles in the fluidized bed from a second spraying nozzle positioned immediately over the fluidized bed.

19. The process according to claim 18 further comprising drying the bed of granular particles in the fluidized bed by the second drying gas flow stream to obtain a final moisture content of about 6 to about 20 percent by weight in the granular particles.

20. A process for the production of calcium hypochlorite from hypochlorous acid comprising the steps of:
   (a) mixing aqueous sodium hydroxide and gaseous chlorine to produce hypochlorous acid;
   (b) mixing aqueous hypochlorous acid and lime to produce an aqueous calcium hypochlorite slurry;
   (c) feeding the calcium hypochlorite in slurry form to a spray dryer to form granular particles by spraying generally downwardly atomized calcium hypochlorite into a cocurrent first drying gas air flow stream separate from the sprayed stream of atomized calcium hypochlorite;
   (d) collecting the granular particles in a fluidized bed at the bottom of the dryer;
   (e) forcing dust particles in the fluidized bed upwardly from the bed of granular particles into a second generally downwardly sprayed atomized calcium hypochlorite at a different height than and below the first generally downwardly sprayed atomized calcium hypochlorite to cause the dust particles to increase in size to minimize the dust in the bed of granular particles; and
   (f) further drying the granular particles by forcing a second drying gas air flow stream at a different height than and below the first drying gas air flow stream through the fluidized bed to obtain a final moisture content in the granular particles.

21. The process according to claim 16 further comprising separating the granular particles by size into on-size and off-size flow streams.

22. The process according to claim 21 further comprising recycling the off-size flow stream to the spray dryer via a recirculation loop for resizing.

23. The process according to claim 22 further comprising feeding the recirculation loop feed into an agglomeration means to adjust the size and density of the granular particles.

24. The process according to claim 22 further comprising feeding dust particles from the recirculation loop into the agglomeration means for agglomeration via moisture addition to form granular particles.

25. The process according to claim 24 further comprising feeding oversized particles from the recirculation loop into the agglomeration means for breaking up into smaller granular particles.

26. The process according to claim 25 further comprising drying the fluidized bed of granular particles with upwardly directed drying gas.

27. The process according to claim 26 further comprising feeding granular particles from the agglomeration means into the fluidized bed.

28. The process according to claim 16 further comprising directing the second drying gas flow stream to flow countercurrent to the first drying gas air flow stream generally upwardly through the fluidized bed of granular particles.

29. The process according to claim 18 further comprising spraying liquified calcium hypochlorite or brine from the second spraying nozzle.

30. The process according to claim 33 further comprising using a turbine agglomerator as the agglomeration means.

* * * * *